United States Patent [19]

Yoshida et al.

[11] Patent Number: 4,679,403
[45] Date of Patent: Jul. 14, 1987

[54] HEAT PUMP APPARATUS

[75] Inventors: Yuji Yoshida, Itami; Shigeo Suzuki, Hirakata; Kazuo Nakatani, Moriguchi; Yuji Mukai, Kadoma; Akira Nakazawa; Takumi Imoto, both of Kusatsu, all of Japan

[73] Assignee: Matsushita Electric Industrial Co., Ltd., Kadoma, Japan

[21] Appl. No.: 772,887

[22] Filed: Sep. 5, 1985

[30] Foreign Application Priority Data

Sep. 6, 1984 [JP] Japan .................. 59-186707
May 14, 1985 [JP] Japan .................. 60-103472

[51] Int. Cl.$^4$ ............................. F25B 13/00
[52] U.S. Cl. .......................... 62/114; 62/324.6
[58] Field of Search ..................... 62/114, 324.6

[56] References Cited

U.S. PATENT DOCUMENTS

| 2,904,973 | 9/1959 | Kosfeld ............... 62/324.6 |
| 3,336,763 | 8/1967 | Lunde ................. 62/114 |
| 3,487,653 | 1/1970 | Myre .................. 62/114 X |
| 3,642,639 | 2/1972 | Murphy et al. ........ 252/67 |
| 4,002,573 | 1/1977 | Hutchinson ........... 62/114 X |
| 4,137,726 | 2/1979 | Watada ............... 62/324.6 X |
| 4,303,536 | 12/1981 | Orfeo et al. ......... 252/67 |
| 4,309,296 | 1/1982 | Enjo et al. .......... 62/114 X |
| 4,311,025 | 1/1982 | Rice ................. 62/114 X |
| 4,406,135 | 9/1983 | Rojey et al. ......... 62/115 |
| 4,423,603 | 1/1984 | Oguni et al. ......... 62/114 X |
| 4,498,999 | 2/1985 | Ramet et al. ......... 62/114 X |
| 4,510,064 | 4/1985 | Ermak ................ 62/114 X |

Primary Examiner—Lloyd L. King
Attorney, Agent, or Firm—Cushman, Darby & Cushman

[57] ABSTRACT

A heat pump apparatus is provided with a multiple-constituent refrigerant mixture which includes a major constituent refrigerant which is above 50% by weight of total refrigerant enclosed in the refrigerating circuit provided with a variable frequency compressor, and a minor constituent refrigerant which has lower critical pressure than that of the major constituent refrigerant.

6 Claims, 4 Drawing Figures

HEAT PUMP APPARATUS

FIELD OF THE INVENTION AND RELATED ART STATEMENT

1. Field of the Invention

The present invention relates to a heat pump apparatus provided with a compressor wherein capacity can be controlled by controlling the frequency of pulsation of the electrical current which is supplied to the drive motor of the compressor.

2. Description of the Related Art

Recently, in cases in which a heat pump apparatus is used in middle range temperatures, in a heat pump called an inverter system, the flow rate of refrigerant is controlled by controling the frequency of the electrical power fed to the motor to drive the compressor, and thereby, refrigerating capacity of air-cooling or air-heating apparatus is controlled. In this system, as shown FIG. 1, the refrigeration cycle is constructed by connecting compressor 1, four way valve 2, primary heat exchanger for a heat sink 3, capillary tube or expansion 4, secondary heat exchanger for a heat source 5 and the like, and further an electric motor 6 for driving compressor 1 is connected to the commercial power source 8 through a frequency inverter 7. In this apparatus, the frequency of the electric motor 6 is controlled in response to required refrigeration capacity. Such a conventional system, however, has such defects as follows.

In such a conventional apparatus which uses a refrigerant of a single component for instance, R 22 or the like, even though the frequency of the motor driving current is increased to increase the flow rate of the refrigerant when a larger refrigeration capacity is required, the condensation temperature rises and the evaporation temperature falls due to constantness of the heat exchanger areas of the primary heat exchanger available to serve as a heat sink and of the secondary heat exchanger for available to serve as a heat source. These characteristics are explained with reference to FIG. 2, wherein curves show the relations between refrigerant pressure and enthalpy. When the frequency is small, the characteristics of the cycle are such as is shown by the solid curve. When the frequency of the electrical power is large, high pressure (at the condensation temperature) rises and low pressure (at the evaporation temperature) falls, and concequently, the characteristics of the cycle are such as is shown by the dotted curve. In this case there is a serious problem that the compression process shown by the curve a-b is changed to the cycle shown by the curve a'-b' thereby decreasing its gradient, as well as one that, the condensation temperature rises. As a result of both of these, temperature of the outlet port of the compressor 1 rises substantially, thereby producing a considerable liability inducing deterioration and decomposition of the refrigerant. There is another problem that, not only is there an undesirable increase of compression workload due to increase of the compression ratio and lowering of adiabatic efficiency, but also due to the rise of the outlet port temperature, the frequency inverter 7 receives a great stress. Still another problem is that, since the lower pressure decreases in spite of the increase of the frequency, the specific volume of the refrigerant at the compressor inlet shown by the points a and a' increases, hence cannot increase the refrigeration capacity proportially in spite of the increasing of frequency.

Therefore in the conventional heat pump apparatus, in view of the device, as a matter of fact an upper limit of changing of frequency is limited or the possibility of using the maximum frequency is limited to the starting of operation of the apparatus. And the variable range of the refrigerating capacity has been much smaller in comparison with the variable range of frequency.

In case that heat pump provided the compressor with an frequency inverter is used for heating at high temperature, for instance supplying hot water, radiant heat, if a single refrigerant called R 12 is used, since its vapor pressure is lower than R 22, it is possible to raise the condensation pressure and to utilize the heat of about 70° C.

On the contrary, because the specific volume of gas of R 12 is larger than R 22, if a compressor having the same volume is used, with the former, the heating capacity drops more than R 22 by 30 to 40%. To make up for those drawbacks of heating ability there is a way of increasing the flow rate of the refrigerant by raising the revolution number of compressor, thereby enabling one to make up the drawback of heating capacity whithout using an unduly large apparatus. However, the discharge temperature of the compressor rises rapidly due to the nature of the refrigerant, and there is a problem of inducing a bad effect on the construction materials and reliability of the compressor.

SUMMARY OF THE INVENTION

The object of the present invention is to provide a heat pump apparatus provided with a compressor in wich rising of discharge temperature is suppressed when compressor drive motor electrical power frequency is increased and one which has an extended variable range of refrigerating capacity thereby extending the range of application of the this apparatus.

Heat pump apparatus in accordance with the present invention is constituted by adding some minor constituent refrigerant which has lower critical pressure than a major constituent refrigerant, which is enclosed as a major element in a refrigerating system comprising a variable frequency compressor. Particularly for use at a middle temperature, for instance for air-cooling or heating, etc., it is possible to use the present heat pump apparatus effectively by selection of a refrigerant of lower critical temperature than that of the major constituent refrigerant as the minor constituent refrigerant; and for use at a high temperature, for instance, for boiling of water, radiation of heat, etc., it is possible to utilize a heat of high temperature by selection of a refrigerant of high critical temperature than that of the major constituent refrigerant as the minor constutuent refrigerant.

DESCRIPTION OF THE PREFERRED EMBODIMENTS

Figure 1:
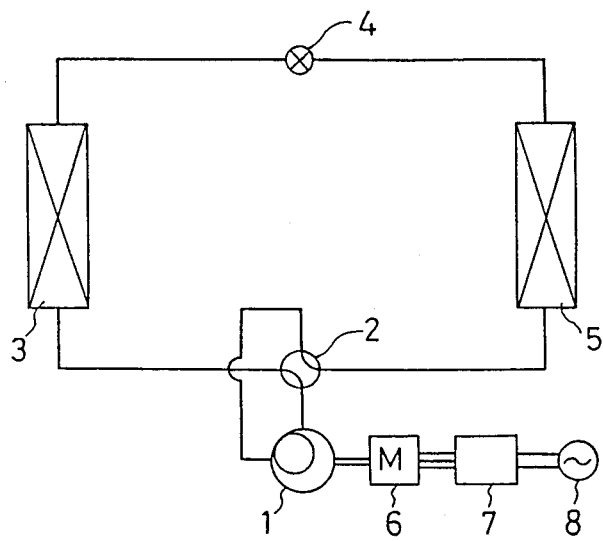
FIG. 1 is diagrammatic illustration of a heat pump apparatus with variable-frequency compressor as its essential part.

Concerning the heat pump apparatus of the present invention, operation and constitution of refrigerant is explained referring to the constituency of an embodiment heat pump apparatus shown in FIG. 1.

At the first time when a comparison is made under the condition of the same condensation temperature, the same evaporation temperature, and the compressor of the same frequency, when the critical temperature of a refrigerant is lower, the refrigerating capacity thereof is higher and when the critical temperature of refrigerant is higher, the refrigerating capacity is lower. This relation is well known, for instance, as disclosed in FIG. 2.21 of a book "Reito-Kucho-Binran, Kisohen (translation of the title of the book: Refrigeration and Airconditioning Handbook, volume of basic technology), published in 1972, by the Japanese Association of Refrigerating.

Figure 2:
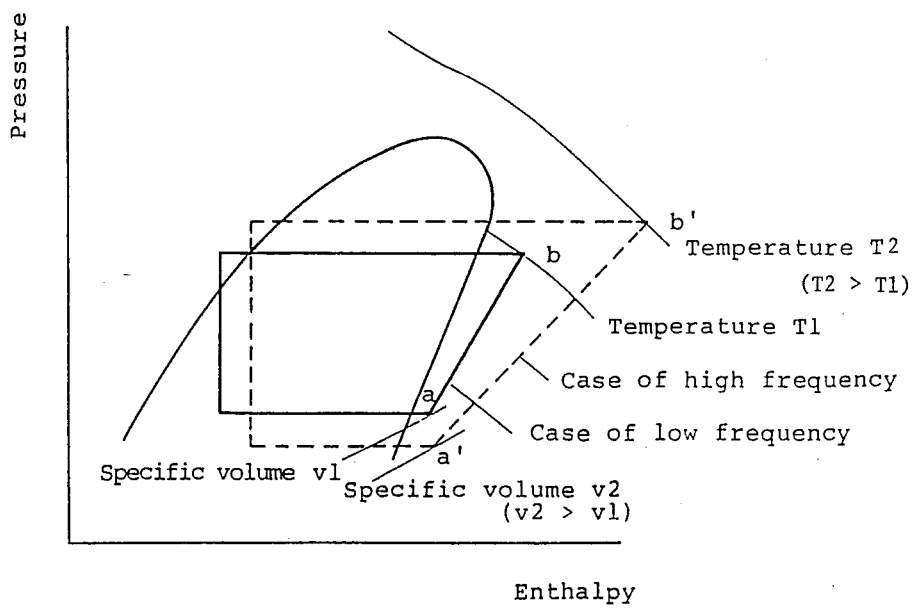
FIG. 2 is a graph showing cycle characteristics of a case wherein a single refrigerant is used in the heat pump apparatus of FIG. 1.
Figure 3:
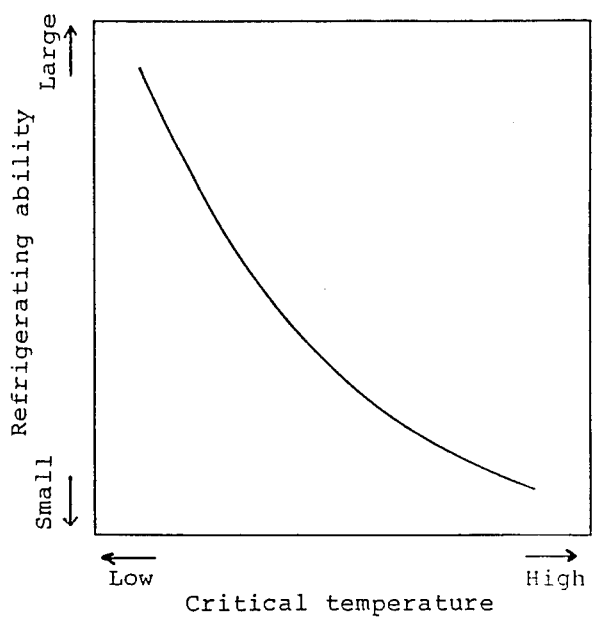
FIGS. 3 and 4 are graphs schematically showing characteristics of the refrigerant used in the heat pump apparatus of the present invention.

In its FIG. 2.21, the above mentioned relation is explained in relation to a normal boiling point, but further, there is disclosed in this literature that there is a proportional relation between the critical temperature and the normal boiling point. Therefore, in an inverter system, if the rates of increase of frequency, condensation temperature, and everporation temperature are respectively the same, the relation is maintained and the trend is such is shown FIG. 3. To the contrary in the inverter system, the lower the critical temperature, the lower is the necessary frequency to keep the required refrigerating capacity and at such a time condensation temperature is lower and evaporation temperature is higher in comparison with a refrigerant having a high critical temperature.

Next, it should be noted that the refrigerant discharge temperature of compressor 1 has a close relation with the critical pressure or molecular weight of each refrigerant, as we have described in Japanese Published Unexamined Patent Application Sho 59-157446(i.e. Japanese Patent Application Sho 58-27962).

Figure 4:
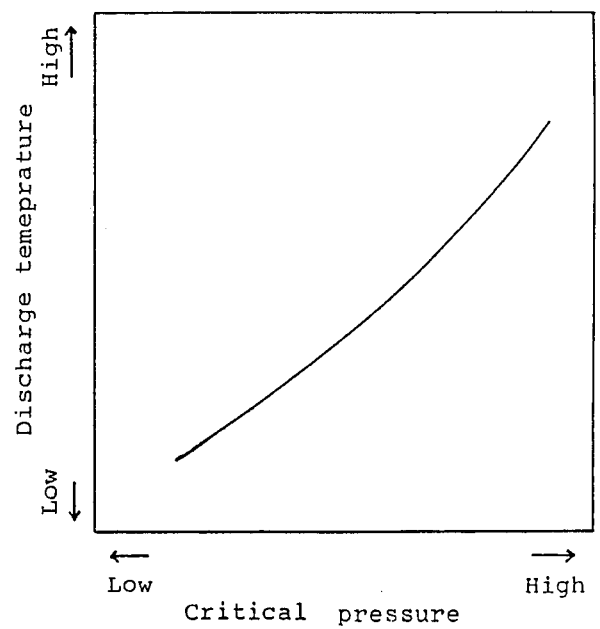

That is to say when comparing the characteristics of the refrigerants under the condition of the same condensation temperature, the same evaporation temperature, and the same frequency of the compressor, the lower critical pressure refrigerant (large molecular weight refrigerant) has a lower discharge temperature and on the contrary the higher critical pressure refrigerant (small molecular weight refrigerant) has a higher discharge temperature. This trend is shown in FIG. 4, wherein, concerning various refrigerants, if the condensation temperature drops to the same extent, their drops in discharge temperature are the same; that is the condensation temperature drop is proportional to the discharge temperature drop.

Next, a first embodiment in accordance with the present invention which utilizes the operation in the middle temperature is explained.

In the heat pump system based on the inverter system, constructed as shown in FIG. 1, a refrigerant having a lower critical pressure and lower critical temperature than a standard refrigerant is enclosed, in order to obtain the same refrigerating capacity as the abovementioned required frequency becomes properly small. And further as a result, the discharge temperature drop becomes prominent because of a synergistic effect based on the effects of condensation temperature drop and discharge temperature drop by the use of the low temperature refrigerant.

Further, it can be considered simply to replace a standard refrigerant with a refrigerant having a low critical pressure and a low critical temperature, but the critical pressure and critical temperature of each refrigerant are its own characteristics values. Therefore, an arbitrary ajustment of discharge temperature is not only impossible but also has such a defect that the low critical temperature refrigerant has a high vapor pressure and that when constructing the refrigerating system, its high pressure rises greatly. Therefore it is found suitable and practical that the standard refrigerant selected corresponding the object a heat pump apparatus should be adopted as a major constituent refrigerant, and an appropriate amount of the minor constituent refrigerant having a lower critical pressure and lower temperature than those of the major constituent refrigerant should be added.

That is to say, by means of adoption of the abovementioned construction in comparison with the heat pump apparatus employing only one conventional standard refrigerant, frequency required to obtain the same refrigerating capacity becomes sufficiently small, and therefore, not only the discharge temperature drops but also the excessive rising of high pressure can be suppressed an the contrary, when increasing of the frequency of the current of the motor 8 by the frequency inverter 7 is maintained to the extent of the prior art apparatus, it is possible to improve the refrigerating ability more than the conventional capacity and further to extend the range of application of the heat pump apparatus as such.

Examples for selections of these refrigerants are provided hereinunder. For the heat pump apparatus for air-cooling or air-heating, wherein hitherto R 22 has been solely used, it is preferable to add refrigerants shown in Table 1 as the minor constituent refrigerant. The critical pressure and critical temperature of them are shown in Table 1. Also in the heat pump apparatus for refrigerating and for supplying-hot-water wherein hitherto R 12 has been used, it is preferable to add refrigerants shown in the Table 2 as the minor constituent refrigerant. The critical pressure and critical temperature of them are shown in Table 2.

TABLE 1

| refrigerant | R22 | R23 | R13 | R116 | SF6 | R13 B1 | R125 |
|---|---|---|---|---|---|---|---|
| critical pressure (atm) | 49.1 | 47.8 | 38.7 | 29.4 | 37.2 | 39.2 | 36.3 |
| critical temperature (°C.) | 96.2 | 25.7 | 28.8 | 19.7 | 45.6 | 67.1 | 68.1 |

TABLE 2

| refrigerant | R12 | R13 | R116 | SF6 | R13 B1 | R125 | R115 | R218 |
|---|---|---|---|---|---|---|---|---|
| critical pressure (atm) | 40.7 | 38.7 | 29.4 | 37.2 | 39.2 | 36.3 | 31.6 | 26.4 |
| critical temperature (°C.) | 111.8 | 28.8 | 19.7 | 45.6 | 67.1 | 68.1 | 80.0 | 71.9 |

The single component refrigerant, usually referred to by a distinct refrigerant number, e.g., R 22, R116, R 12 is a substance mainly belonging to the class of halogenated hydrocarbons. And the refrigerant number is chosen in the following way:

The leftmost figure in the three digit figure shows the carbon number of a molecule of the particular refrigerant, 1 (−1); the middle figure shows the number of hydrogen atoms in the molecule, plus 1 (+1), and the rightmost figure shows fluorine number.

The method to give the refrigerant number is the same method as defined by an ASHRAE standard (The American Society of Heating, Refrigerating and Air Conditioning Engineers). For instance, R 22, R 12, R 116, R 13 B 1 and R 218 designate CHClF$_2$, CCl$_2$F$_2$, C$_2$F$_6$, CF$_3$Br and C$_3$F$_8$, respectively.

The critical pressure and the critical temperature are characteristic values of these substance, and these values shown in the Tables 1 and 2 have been given and recommended by researchers in the past. Further, as above mentioned, the critical pressure of a refrigerant particularly has a close relation with its molecular weight. In general, in halogenated hydrocarbons, the larger the molecular weight the refrigerant has, the lower is the critical pressure, and the smaller the molecular weight the refrigerant has, the higher is the critical pressure. Therefore for minor constituent refrigerants of low critical pressure, a selection for a substance which includes larger molecular weight halogen atoms, in such an order of atomic weight as fluorine, chlorine and bromine, may be made; but preferably the selection should be made on the basis of the measured value or recommended value of the critical pressure.

Furthermore, as described in the embodiment, because the critical pressure is closely concerned with the molecular weight and the critical temperature is closely concerned with normal boiling point, the standard of selection for a minor constituent refrigerant may be represented by any of the following verbal expressions each of which has the same meaning:

(a) A refrigerant having low critical pressure and low critical temperature.
(b) A refrigerant having low critical pressure and low normal boiling point.
(c) A refrigerant having large molecular weight and low critical temperature.
(d) A refrigerant having large molecular weight and low normal boiling point.

The present invention may be modified in the following manner. Besides the minor constituent refrigerant, a third ingredient may be included to improve the efficiency. Furthermore such modifications may be made that the frequency (by which we mean the number of revolutions per unit time) of a compressor with a non-electric motor such as a gas-engine driven compressor is variable, such that a special device is made so as to circulate a larger amount of minor constituent refrigerant when a large refrigerating capacity is necessitated.

In the heat pump apparatus as shown FIG. 1, elucidation is made on a case wherein a primary heat exchanger for a heat sink 3 operates as a condenser and a secondary heat exchanger for a heat source 5 operates as an evaporater, so that this heat pump is used for heating at high temperature by giving heat to the water and air in the condenser 3.

In this case, because almost all of the high critical temperature refrigerants have a low vapor pressure, it is possible to lower the condensation pressure of the major constituent refrigerant by adding a suitable amount of a high critical temperature minor constituent refrigerant. Also, it is possible to raise the condensation temperature, while maintaining an appropriate condensation pressure. However because the high critical temperature refrigerant generally has a large specific volume as a gas, if a compressor of the same cylinder volume as the conventional compressor would be used, the flow rate of the refrigerant would decrease, and hence heating capacity would decrease.

Therefore, in order to dissolve this problem, a variable frequency compressor is employed, thereby to operate the compressor at a higher frequency than the frequency of a commercial power source, and to maintain the necessary rate of circulation of the refrigerant, without introduction of another or larger equipment. Further, since the added high critical temperature minor constituent refrigerant, which is a feature of the present invention, is a low critical pressure refrigerant, it is possible to utilize high temperature heat without undesirable rising of the discharge temperature.

Also when the above mentioned majority ingredient refrigerant is R 22 or R 12, and the minor constituent refrigerant having a high critical temperature and a low critical pressure such as is shown in Table 3 or 4 is added, it is possible to utilize heat at higher temperature than hitherto realized with the single component refrigerant.

TABLE 3

| refrigerant | R22 | R12 | R152a | R124 | R142b | RC318 | R12B1 | R114 | R133a | R11 |
|---|---|---|---|---|---|---|---|---|---|---|
| critical pressure (atm) | 49.1 | 40.7 | 44.4 | 36.3 | 40.7 | 27.4 | 40.7 | 32.2 | 40.1 | 43.5 |
| critical temperature (°C.) | 96.0 | 111.8 | 113.4 | 122.2 | 137.0 | 115.2 | 154.6 | 145.7 | 155.0 | 198.0 |

TABLE 4

| refrigerant | R12 | R124 | R142b | RC318 | R114 | R133a |
|---|---|---|---|---|---|---|
| critical pressure (atm) | 49.1 | 36.3 | 40.7 | 27.4 | 32.2 | 40.1 |
| critical temperature (°C.) | 111.8 | 122.2 | 137.0 | 115.2 | 145.7 | 155.0 |

Also in this case even if the term "high critical temperature refrigerant" is replaced by, "high normal boiling point refrigerant," the above relation is maintained; and also, even if the wording "low critical pressure refrigerant" is replaced by words, "large molecular weight refrigerant," almost the same relation is maintained. Such wording in other words is included in the present invention.

The reason why the major constituent refrigerant is to be contained above 50 wt% is that if too much of the above-mentioned substance of the minor constituent refrigerant is added, the heating capacity drops excessively and the revolution number must be made excessive large, to invite a decline of efficiency of compressor as such. Therefore it is desirable that more than half of total refrigerant is major constituent refrigerant. Further it is admissible to add at least one other ingredient within the scope of the present invention.

The effect of the present invention is described as follows by taking an example realized for utilization in heating at high temperature in an apparatus for supplying hot water.

EXAMPLE 1

In the heat pump system as shown in FIG. 1, output power of the compressor is substantially one horse power and, heat exchangers between water and refrigerant are used as the condenser and the evaporator, through which water flows at the rate of 2.5 l/min. And as refrigerants, R 22 and R 22/R 152a (weight ratio 80/20) are used, and the peaks of their coefficients of performance are compared under the conditions that filled refrigerant amount and opening degree of capillary tube or expansion valve are modulated to keep the same condensation temperature each other.

The result of this embodiment is shown in Table 5.

TABLE 5

| refrigerant | condensation temperature | condensation pressure | exhaust temperature |
|---|---|---|---|
| R 22 | 43° C. | 15.9 kg/cm$^2$ G | 92° C. |
| R 22/R 152a (80/20) | 43° C. | 13.5 kg/cm$^2$ G | 81° C. |

In the case where R 22/R 152a (80/20) is used, the heating capacity is decreased by 7% in comparison with the case of R 22 alone, and the coefficient of performance is increased by 5% in comparison with the case of R 22 alone.

Next, in this case, when a frequency converter is connected to the compressor from outside and the frequency of the commercial power source (which in this case is 60 Hz) is raised to 70 Hz, the heating ability increases by 3% in comparison with the case of R 22 alone, condensation temperature, condensation pressure and discharge temperature becomes 45° C., 14.2 kg/cm$^2$G and 88° C., respectively.

That is to say, as the result of using the abovementioned mixed refrigerant and variable-frequency type compressor, it becomes possible to lower the condensation pressure and discharge temperature, while maintaining the heating capacity.

Further when frequency increases up to a condensation temperature equal to that of R 22, it is possible to improve the heating ability and the condensation temperature more than the case of R 22 and to hold the discharge temperature substantially equal to that of the case of R 22.

EXAMPLE 2

The same experimental apparatus as that of the EXAMPLE 1 is used, and R 12 and R12/R 114 (weight ratio 70/30) are used as a mixture refrigerant. And in the same operation as that of EXAMPLE 1, comparison of refrigerants between R 12 and R 12/R 114 are made under such controls that condensation temperatures of the two refrigerant are maintained at 70° C. Then to 60 Hz of R 12 alone the heating capacity of R 12/R 114 was almost equal at 70 Hz, and latter's condensation pressure dropped by 5 kg/cm$^2$ and discharge temperature was 77° C., which was lower than the case of R 12 alone, 60 Hz, by about 7° C. This discharge temperature is not so high as to badly effect the life and reliability of the apparatus.

Therefore, it is further possible to increase the condensation pressure up to about that of R 12, by increasing the revolution number of compressor, thereby further improving the condensation temperature and heating capacity higher than the case of R 12.

What is claimed is:
1. A method for operating a heat pump that includes:
a refrigeration circuit comprising and operatively connecting:
(a) a variable-r.p.m. compressor;
(b) a primary heat exchanger for a heat sink;
(c) a capillary tube or expansion valve; and
(d) a secondary heat exchanger for a heat source,
so as to lower the discharge temperature of the compressor at times when the compressor is being operated at speeds in excess of that at which said compressor would be operated by an electric motor powered directly by alternating electric current of supplied hertz, in comparison with the discharge temperature of the compressor if said heat pump were using a single constituent refrigerant as the refrigeration circuit working fluid,
said method comprising:
operating said compressor at said speeds in excess, while using a constant-composition multiple-constituent refrigerant as the refrigeration circuit working fluid, said constant composition multiple-constituent refrigerant being one selected from the group consisting of:
(i) at least 50 percent by weight of R22, and at least one minor constituent refrigerant selected from the group consisting of R23, R13, R116, SF6, R13 B1, R125, R12, R152a, R124, R142b, RC318, R12B1, R14, R133a and R11; and
(ii) at least 50 percent by weight of R12, and at least one minor constituent refrigeraant selected from the group consisting of R13, R116, SF6, R13 B1, R125, R115, R218, R124, R142b, RC 318, R114 and R133a.
2. A heat pump apparatus having:
a refrigeration circuit comprising and operatively connecting
a compressor to be operated with variable frequency,
a primary heat exchanger for a heat sink,
a capillary tube or expansion valve, and
a secondary heat exchanger for a heat source, and further having
a constant-composition multiple-constituent refrigerant operably contained in said refrigeration circuit, said constant-composition multiple-constituent refrigerant being one selected from the group consisting of:
(i) at least 50 percent by weight of R22, and at least one minor constituent refrigerant having a lower critical pressure than that of said R22 selected from the group consisting of R23, R13, R116, SF6, R13 B1, R125, R12, R152a, R124, R142b, RC318, R12 B1, R114, R133a and R11; and
(ii) at least 50 percent by weight of R12, and at least one minor constituent refrigerant having a lower critical pressure than that of said R12, selected from the group consisting of R13, R116, SF6, R13 B1, R125, R115, R218, R124, R142b, RC318, R114 and R133a,
so as to lower the discharge temperature of the compressor at maximum frequency, in comparison with the discharge temperature of the compressor if said heat pump were using a single constituent refrigerant of R22 or R12 as the refrigeration circuit working fluid.

3. The heat pump apparatus of claim 2, wherein:
said at least one minor constituent refrigerant is one selected from the group consisting of R13, R116, SF6, R13 B1, R125, R12, R152a, R125, R142b, RC318, R12 B1, R114, R133a and R11.

4. A heat pump apparatus having:
a refrigeration circuit comprising and operatively connecting
  a compressor to be operated with variable frequency,
  a primary heat exchanger for a heat sink,
  a capillary tube or expansion valve, and
  a secondary heat exchanger for a heat source, and further having
a constant-composition multiple-constituent refrigerant operably contained in said refrigeration circuit, said constant composition multiple-constituent refrigerant being one selected from the group consisting of:
  (i) at least 50 percent by weight of R22, and at least one minor constituent refrigerant having a lower critical pressure and a lower critical temperature than those of said R22, selected from the group consisting of R23, R13, R116, SF6, R13 B1, R125; and
  (ii) at least 50 percent by weight of R12, and at least one minor constituent refrigerant having a lower critical pressure and a lower critical temperature than those of said R12, selected from the group consisting of R13, R116, SF6, R13 B1, R125, R115, R218,
so as to lower the discharge temperature of the compressor and increase the refrigerating or heating capacity at maximum frequency, in comparison with the discharge temperature of the compressor and the refrigerating or heating capcity if said heat pump were using a single constituent refrigerant of R22 or R12 as the refrigeration circuit working fluid.

5. The heat pump apparatus of claim 4, wherein:
said at least one minor constituent refrigerant is one selected from the group consisting of R13, R116, SF6, R13 B1, R125.

6. A heat pump apparatus having:
a refrigeration circuit comprising and operatively connecting
  a compressor to be operated with variable frequency,
  a primary heat exchanger for a heat sink,
  a capillary tube or expansion valve, and
  a secondary heat exchanger for a heat source, and further having
a constant-composition multiple-constituent refrigerant operably contained in said refrigeration circuit, said constant-composition multiple-constituent refrigerant being one selected from th group consisting of:
  (i) at least 50 percent by weight of R22, and at least one minor constituent refrigerant having a lower critical pressure and a higher critical temperature than those of R22, selected from the group consisting of R12, R152a, R124, R142b, RC318, R12B1, R114, R133a and R11; and
  (ii) at least 50 percent by weight of R12, and at least one minor constituent refrigerant having a lower critical pressure and a higher critical temperature than those of said R12, selected from the group consisting of R124, R142b, RC318, R114 and R133a
so as to lower the discharge temperature of the compressor and increase the condensation temperature at maximum frequency, in comparison with the discharge temperature of the compressor and the condensation temperature if said heat pump were using a single constituent refrigerant of R22 or R12 as the refrigeration circuit working fluid.

* * * * *